No. 825,732. PATENTED JULY 10, 1906.
C. A. JANSON.
EMULSIFIER.
APPLICATION FILED OCT. 13, 1905.

UNITED STATES PATENT OFFICE.

CARL AUGUST JANSON, OF CHICAGO, ILLINOIS.

EMULSIFIER.

No. 825,732.    Specification of Letters Patent.    Patented July 10, 1906.

Application filed October 13, 1905. Serial No. 282,652.

*To all whom it may concern:*

Be it known that I, CARL AUGUST JANSON, a subject of the King of Sweden, and a resident of Chicago, in the county of Cook and State of Illinois, have invented certain new and useful Improvements in Emulsifiers, of which the following is a specification.

This invention relates to apparatus for mixing liquids, and is particularly adapted for emulsifying milk and fatty oils in the manufacture of renovated butter or substitutes for butter.

The main object of this invention is to provide a simple, inexpensive, and efficient apparatus of this class. I accomplish this object by the device shown in the accompanying drawings, in which—

Figure 1 is a top plan, partly broken away, of an emulsifier constructed according to my invention. Fig. 2 is a vertical section on the line 2 2 of Fig. 1. Fig. 3 is a horizontal section of the stirring-arm on the line 3 3 of Fig. 2, a portion of the adjacent side wall of the rotating vessel being shown to illustrate the relative disposition of the stirring-arm and the direction of the apertures therein.

In the construction shown in the drawings the supporting-frame 4 is in the form of a bowl at its upper part and has journaled therein a vertically-disposed shaft 5. The shaft 5 is adapted to be rotated by mechanism in the lower part of the supporting-frame 4, but omitted from the drawings. Mounted on the upper end of the shaft within the bowl 4 is a vessel 6, which is substantially cylindrical and has an opening 7 in its top of considerably less diameter than that of the side walls. The periphery of the vessel 6 is provided with a heavy bead 8 to give a fly-wheel effect and insure the steady rotation of the vessel.

The inner surface of the side walls of the vessel is provided with a plurality of narrow radially-disposed blades 9, which insure that the contents will rotate with the vessel. The bowl of the supporting-frame is provided with a cover 10, which has a central opening 11, registering with the opening 7 in the vessel. Agitation of the contents of the vessel during its rotation is accomplished by means of a stirring-arm 12, which is carried by a lever 13, pivotally connected to the cover 10 by means of the bolt 14, which is threaded into the cover 10 and provided with a knurled head. This bolt also serves as a clamp for securing the lever 13 in the desired angular position. The arm 12 extends through the openings 11 and 7 and has a vertically-disposed part 15 adjacent to the side walls of the vessel 6. This part 15 may be adjusted toward and away from the wall by swinging the handle 13 on its pivotal axis. The part 15 is provided with a series of conical apertures 16, having their axes disposed at an angle to the peripheral direction of rotation of the vessel 6. The disposition of these apertures is best shown in Fig. 3. The side 17 of the part 15, which faces the rotating contents of the vessel 6, is also disposed at an angle to the peripheral direction of movement of said particles and serves to guide the same toward the apertures 16. The wall 18 of the part 15, which lies between each aperture 16 and the adjacent wall of the vessel 6, is sharpened at the front edge 19 and is of scalloped or fluted form, so as to provide channels in its face intermediate between the apertures 16. Such of the contents of the vessel as pass through the apertures 16 are thrown inward out of their normal path, while adjacent particles pass in a direct course through the channels 20. This action causes a thorough agitation of the watery and oily contents and produces an emulsion. The emulsified contents are drawn off by the curved pipe 21, the nozzle 22 of which faces the peripheral direction of rotation of the contents of the vessel, and the momentum of said contents causes the same to be carried out through the pipe 21. The pipe 21 is mounted upon the cover 10 and is adjustable radially by means of its threaded connection with a knurled sleeve 23, which is mounted to rotate, but is secured against radial shifting on the cover.

A pair of the receiving vessels or funnels 24 and 25 are rigidly connected together and removably secured to the cover 10. Each of these has a spout 26 extending into the middle part of the vessel 6 to a point near the bottom.

In the operation of the device shown the liquids which are to be emulsified are fed into the funnels 24 and 25. The rotation of the vessel 6 causes these to fly outwardly and accumulate against the outer walls of said vessel. The stirrer 12 disturbs the continuous circular rotation of the contents and causes portions thereof to be deflected inward toward the middle of the vessel 6, while adjacent portions continue their circular motion. This peculiar agitation insures the mixture of the watery and fatty particles in the form of an emulsion, which is finally drawn off at the top of the vessel by means of the pipe 21 and is then, in the case of butter, ready to be churned and packed.

What I claim as my invention, and desire to secure by Letters Patent, is—

1. An emulsifier comprising a frame, a vessel open at the top and mounted to rotate on a vertically-disposed axis in said frame, means for feeding liquid into said vessel, and a stationary stirring device mounted on said frame and extending into said vessel, said stirring device having a vertically-disposed part adjacent to the side walls of said vessel and said part having a plurality of apertures extending through the same at an angle to the adjacent wall of the vessel and adapted to deflect portions of the contents inwardly away from said wall against the centrifugal action.

2. An emulsifier comprising a frame, a vessel open at the top and mounted to rotate on a vertically-disposed axis in said frame, means for feeding liquid into said vessel, and a stationary stirring device mounted on said frame and extending into said vessel, said stirring device having a vertically-disposed part adjacent to the inner wall of said vessel said vertically-disposed part having a plurality of apertures extending through the same at an angle to the adjacent wall of the vessel and having a plurality of grooves in its face which is opposed to said wall, said grooves and apertures being alternately located along said part, whereby certain alternate layers of the contents of the vessel will be deflected inwardly away from the walls while the intermediate layers will continue in their direct course of rotation.

3. An emulsifier, comprising a frame, a vessel open at the top, and mounted to rotate on a vertically-disposed axis in said frame, means for feeding liquid into said vessel, a stationary stirring device mounted on said frame and extending into said vessel, said stirring device having thereon a surface inclined to the direction of rotation of said vessel and adapted to deflect a portion of the liquid therein inward from the outer walls, and means for adjusting said surface toward and away from the side walls of said vessel.

4. An emulsifier comprising a frame, a vessel open at the top and mounted to rotate on a vertically-disposed axis in said frame, means for feeding liquid into said vessel, and a stationary stirring device mounted in said frame and extending into said vessel, said stirring device having a vertically-disposed part adjacent to the side walls of said vessel and having a plurality of apertures extending through the same at an angle to the peripheral direction of rotation of the vessel and adapted to deflect portions of the contents inwardly against the centrifugal action, said apertures being of conical form and having their small end facing opposite to the direction of rotation of said vessel, the portion of said part which lies between said apertures and the adjacent wall of the vessel being formed to present a sharp edge to the current of the liquid in said vessel.

Signed at Chicago this 9th day of October, 1905.

CARL AUGUST JANSON.

Witnesses:
EUGENE A. RUMMLER,
GLEN C. STEPHENS.